US008049024B2

(12) United States Patent
Marciniec et al.

(10) Patent No.: US 8,049,024 B2
(45) Date of Patent: Nov. 1, 2011

(54) HETEROGENIZED RHODIUM COMPLEXES, METHODS OF THEIR SYNTHESIS AND APPLICATION AS HYDROSILYLATION CATALYSTS

(75) Inventors: Bogdan Marciniec, Poznan (PL); Ryszard Fiedorow, Poznan (PL); Karol Szubert, Czerwonak (PL); Ireneusz Kownacki, Powidz (PL); Adrian Franczyk, Kutnoz (PL); Michal Dutkiewicz, Poznan (PL); Kinga Leszczak, Poznan (PL)

(73) Assignee: Adam Mickiewicz University, Poznan (PL)

( * ) Notice: Subject to any disclaimer, the term of this patent is extended or adjusted under 35 U.S.C. 154(b) by 315 days.

(21) Appl. No.: 12/310,967

(22) PCT Filed: Sep. 12, 2007

(86) PCT No.: PCT/PL2007/000064
§ 371 (c)(1),
(2), (4) Date: Mar. 13, 2009

(87) PCT Pub. No.: WO2008/033043
PCT Pub. Date: Mar. 20, 2008

(65) Prior Publication Data
US 2010/0048932 A1 Feb. 25, 2010

(30) Foreign Application Priority Data

Sep. 16, 2006 (PL) .......................... 380621
Jan. 19, 2007 (PL) .......................... 381555
Jan. 19, 2007 (PL) .......................... 381556
Aug. 29, 2007 (PL) .......................... 383213

(51) Int. Cl.
    *C07F 7/08* (2006.01)
(52) U.S. Cl. ......................................... 556/10
(58) Field of Classification Search .................. 556/10
    See application file for complete search history.

(56) References Cited

FOREIGN PATENT DOCUMENTS
PL          194667 B1          6/2007

OTHER PUBLICATIONS

Raja et al., Journal of American Chemical Society, vol. 125, No. 49, pp. 14982-14983 (2003).*
Polish Patent Application No. 380735 filed Sep. 10, 2006. (w/ English abstract).
Polish Patent Application No. 380736 filed Sep. 10, 2006. (w/ English abstract).
Polish Patent Application No. 380737 filed Sep. 10, 2006. (w/ English abstract).
Ward, Michael D. et al., "Synthesis and Partial Characterization of (Silica)rhodium Dihydrides: A New Catalyst for Olefin Hydrogenation," J.C.S. Chem. Comm., 1980, pp. 357-359.
Dufour, P. et al., "Surface Organometallic Chemistry: Reaction of Tris-Allyl Rhodium with Surfaces of Silica, Alumina, Titania, and Magnesia," J. American Chemical Society, 1992, pp. 4248-4257, vol. 114, No. 11.
Scott, Susannah L. et al., "Surface Organmetallic Chemistry on Oxides: Reaction of Trimethylphosphine with Bis(allyl)rhodium Grafted onto Silica," Inorganic Chemistry, 1996, pp. 869-875, vol. 35, No. 4.
Scott, Susannah L. et al., "Silica-supported rhodium hydrides stabilized by triisopropylphosphine," Journal of Molecular Catalysis A: Chemical 204-205, 2003, pp. 457-463.
Marciniec, Bogdan et al., "Comprehensive Handbook on Hydrosilylation," 1992, pp. 49-62 and 88-93, Pergamon Press, Oxford.
Marciniec, Bogdan et al., "Catalytic Activity of Rhodium-Siloxide Complexes in Hydrosilylation of Allyl Ethers and Allyl Esters,"Organosilicon Chemistry V; From Molecules to Materials, 2003, pp. 415-419, Wiley-VCH GmbH & Co., Weinheim.
Marciniec, Bogdan et al., "Synthesis, first structures, and catalytic activity of the monomeric rhodium(I)-siloxide phosphine complexes," Can. J. Chem. 2003, pp. 1292-1298, vol. 81.
Marciniec, Bogdan et al., "Catalytic activity of silyloxy-rhodium(I) complexes in hydrosilylation of alkenes," Journal of Molecular Catalysis A: Chemical 144, 1999, pp. 263-271.
Marciniec, Bogdan et al., "Recent advances in catalytic hydrosilylation," Journal of Organometallic Chemistry, 446, 1993, pp. 15-23.
Leadbeater, Nicholas E. et al., "Preparation of Polymer-Supported Ligands and Metal Complexes for Use in Catalysis," Chemical Reviews, Sep. 24, 2002, pp. 3217-3273, vol. 102, No. 10.
Song, Choong Eui et al., "Supported Chiral Catalysts on Inorganic Materials," Chemical Reviews, Aug. 27, 2002, pp. 3495-3524, vol. 102, No. 10.
Michalska, Z.M. et al., "Synthesis and catalytic activity of the transition metal complex catalysts supported on the branched functionalized polysiloxanes grafted on silica," Journal of Molecular Catalysis A: Chemical 208, 2004, pp. 187-194.
Marciniec, Bogdan et al., "Modification of (Poly)Siloxanes via Hydrosilylation Catalyzed by Rhodium Complex in Ionic Liquids#," Chemical Monthly, 2006, pp. 605-611, 137.
Wyszpolska, Agnieszka et al., "Synthesis and the Main Applications of Silicone Waxes," Polish Journal of Chemical Technology, 2003, pp. 14-16, vol. 5, No. 4.
Maciejewski, H. et al., "Hydrosilylation of functionalised olefins catalysed by rhodium siloxide complexes in ionic liquids," Green Chemistry, Apr. 29, 2009.

* cited by examiner

*Primary Examiner* — Porfirio Nazario Gonzalez
(74) *Attorney, Agent, or Firm* — Oliff & Berridge, PLC

(57) ABSTRACT

The subjects of the invention are new heterogenized rhodium complexes, the methods of their synthesis and their application as catalysts for synthesis of organosilicon compounds by hydrosilylation. The subject of the invention are new siloxide rhodium(I) complexes immobilised on the silica surface, of the general formula 1. [(≡SiO)(L)Rh(diene)] The second subject of the invention is the method of synthesis of the new rhodium complexes of the general formula 1. The third subject of the invention is the method of obtaining the organosilicon compounds in the reaction of hydrosilylation between the selected alkenes or functionalised alkenes containing the terminal C═C bond and the appropriate compounds containing the Si═H bond selected from silanes, (poly)siloxanes and (poly)carbosiloxanes, in the presence of heterogenized rhodium catalysts, of the general formula 1.

6 Claims, No Drawings

HETEROGENIZED RHODIUM COMPLEXES, METHODS OF THEIR SYNTHESIS AND APPLICATION AS HYDROSILYLATION CATALYSTS

The subjects of the invention are new heterogenized rhodium complexes, the methods of their synthesis and their application as catalysts for synthesis of organosilicon compounds by hydrosilylation.

The hitherto known heterogenized siloxyl complexes of transition metals include those of zirconium, tantalum, molybdenum, wolfram, rhenium and rhodium. All these complexes are obtained as a result of substitution of carbyl, carbonyl or hydride ligands with the silanol groups on the silica surface. Literature describes the siloxyl rhodium complexes immobilized on the silica surface obtained as a result of the reaction between the $Rh(allil)_3$ complex with silica (1, 2). The complex $(\equiv SiO)(\equiv SiOX)Rh(\eta^3-C_3H_5)_2$ is directly bound to silica through the bond Si—O—Rh, and in the coordination sphere of rhodium there are two allyl ligands. The complex $(\equiv SiO)(\equiv SiOX)Rh(\eta^3-C_3H_5)_2$ can be modified by introducing into the coordination sphere of rhodium the following compounds or elements: trialkylphosphine (3, 4), carbon oxide (3) or hydrogen (1). These compounds reveal catalytic activity in hydrogenation of alkenes (1). The catalysts used in the known reactions of organosilicon compounds synthesis by hydrosilylation included also siloxyl rhodium complexes. Patent PL194667 presents the reaction of synthesis of 3-glicycloxy (or butyloxy or phenyloxy) propylosilanes in the presence of di-μ-trimethylsiloxybis{(1,5-cyclooctadiene) rhodium(I)} as a catalyst (6). Literature provides the ways of syntheses of 3-glicycloxy(or butyloxy or phenyloxy) propylosilanes in the presence of (1,5-cyclooctadiene)(tricyclohexylphosphine)(trimethylosiloxy)rhodium(I) (7).

The reaction of hydrosilylation of alkenes (hexene in the presence of di-μ-trimethylsiloxybis{(1,5-cyclooctadiene) rhodium(I)} as a catalyst has been worked out by (8).

The process of hydrosilylation is the most often used method of synthesis of organofunctional siloxanes and polysiloxanes, and involves addition of trisubstitutedsilanes and hydrosiloxanes to the multiple bonds of the type C=C, C≡C, C=O, C=N, etc., and it permits getting polysiloxanes of tailored properties by the choice of proper alkenes. The synthesis of poly(methylalkyl)siloxanes by modification of poly(methylhydro)siloxanes in the reaction of hydrosilylation of alkenes catalysed by transition metal complexes has been developed by (5). The most often used catalysts of hydrosilylation reaction from among the complexes of the cobalt group metals are rhodium ones (5, 9). Particularly beneficial in the reaction of hydrosilylation has proved the use of siloxide rhodium (I) complexes rhodium(I), such as [{Rh(cod)(μ-OSiMe_3)}_2] and [Rh(cod)(PCy_3)(OSiMe_3)] (6, 7). The siloxide rhodium complexes show much higher catalytic activity and greater selectivity in milder conditions than the commonly used platinum catalysts. An important drawback of the homogeneous catalysts is the problem with their removal from the post-reaction system and their decomposition during the reaction.

An alternative to the homogeneous catalysts are the heterogenized ones, in which the metal complex is bound to the solid organic support such as polymers or copolymers or inorganic support (10, 11). In the known heterogenized catalysts the anchoring of the metal complex on the support surface is realised through the strongly coordinating groups containing the atoms P, S, N, O present on the support surface. Most often the transition metal complexes are bound to the support via phosphine groups. The heterogenized catalysts on organic support are poorly resistant to elevated temperatures, which restricts the range of their use. According to literature reports (12) it is possible to repeat the use of the rhodium catalysts supported on polymers, however, this repeated use is restricted to a few times as the catalyst activity in subsequent cycles of the reaction rapidly decreases and after the 3$^{rd}$ or the 4$^{th}$ use it is usually lower than 50% of the original activity. Hydrosilylation of alkenes with trisubstitutedsilanes or hydropolysiloxanes has been also reported to occur in the presence of rhodium complexes immobilised in imidazolium ionic liquids (13, PL380736, PL380737), however, the catalyst of this type are expensive and active in elevated temperatures, over 80° C., which considerably restricts the range of their use (13).

Polysiloxanes containing long-chain alkyl groups make a large group of compounds known as silicon waxes. These compounds are usually obtained in the process of hydrosilylation conducted among others in the presence of homogeneous rhodium catalysts (14).

The aim of the invention was to propose new multiple use catalysts of the process of hydrosilylation.

The subject of the invention are new siloxide rhodium(I) complexes immobilised on the silica surface, of the general formula 1

$$[(\equiv SiO)(L)Rh(diene)] \qquad (1)$$

in which:
 diene stands for cyklooktadiene, norbomadiene or tetrafluorobenzobarrelene
 L stands for a subsequent unit ≡SiOX on the silica surface of the general formula 2

$$\equiv SiOX \qquad (2)$$

where X is the hydrogen or a silicon atom or a phosphine ligand of the general formula 3, $$PR^1_3 \qquad (3)$$

in which $R^1$ stands for the alkyl, cycloalkyl or phenyl group, and the rhodium atom is directly complexed with silica through the silicon-oxygen-rhodium bond.

The second subject of the invention is the method of synthesis of the new rhodium complexes of the general formula 1, in which diene and L have the above-specified meaning. According to the invention, these complexes are obtained in the reaction of exchange of siloxyl ligands in the coordination sphere of the metal between the molecular binuclear siloxide complexes of the general formula 4, $$[\{Rh(\mu\text{-}OSiR^2_3)(diene)\}_2] \qquad (4)$$

in which diene has the above-specified meaning, and $R^2$ stands for the alkyl or phenyl group; or mononuclear siloxyl complexes of the general formula 5, $$[Rh(diene)(PR^1_3)(OSiR^2_3)] \qquad (5)$$

in which diene, $R^1$, $R^2$ have the above-specified meaning, and the silanol groups present on the silica support surface. According to the invention the reaction is conducted in anhydrous and deoxygenated solvent, non-coordinating with rhodium in a neutral gas atmosphere.

The third subject of the invention is the method of obtaining the organosilicon compounds in the reaction of hydrosilylation between the selected alkenes or functionalized alkenes containing the terminal C=C bond and the appropriate compounds containing the Si—H bond selected from silanes, (poly)siloxanes and (poly)carbosiloxanes, in the presence of heterogenized rhodium catalysts being also the subject of this invention. The reaction is conducted in a neutral gas atmosphere at a temperature from the range of room temperature to 100° C.

In particular, the method of synthesis of organosilicon compounds being the subject of this invention can be applied for obtaining (alkyl, aryl)silylpropyl ethers and for modification of polysiloxanes.

According to the invention, the synthesis of (alkyl, aryl) silylpropyl ethers of the general formula 6,

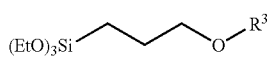
(6)

in which $R^3$ stands for the alkyl, phenyl or glycidyl group, involves the addition of triethoxysilane to alkyl- or aryl-allyl ethers of the general formula 7

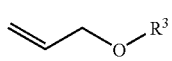
(7)

in which $R^3$ has the above-specified meaning, in the presence of a catalyst being a heterogenized siloxide complex of rhodium (I) immobilised on the silica surface, of the general formula 1, in which diene and L have the above-specified meaning. The reaction is conducted in a neutral gas atmosphere at a temperature ranging from room temperature to 100° C.

According to the invention, the modification of polysiloxanes involves their addition to appropriate alkenes or vinylsiloxanes.

According to the invention, the reaction of polysiloxanes modification involves the catalytic hydrosilylation of alkenes of the general formula 8

$$CH_2=CH-(CH_2)-CH_2R^4 \quad (8)$$

in which:
$R^4$ stands for hydrogen if n varies from 3 to 13, or
$R^4$ stands for the alkoxyl, glicydoxyl, phenoxyl or phenyl groups, if n=0; by (poly)siloxanes of the general formula 9,

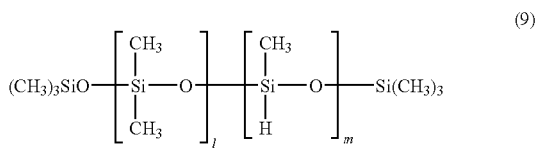
(9)

in which I jest varies from 0 to 50 and m varies from 1 to 25, and the dimethylsiloxyl and methylhydrosiloxyl groups are alternately arranged and statistically distributed along the chain, in the presence of the catalysts of the general formula 1 in which diene and L have the above specified meaning.

According to the invention, another reaction of polysiloxanes modification involves catalytic hydrosilylation of vinyl (poly)siloxanes of the general formula 10,

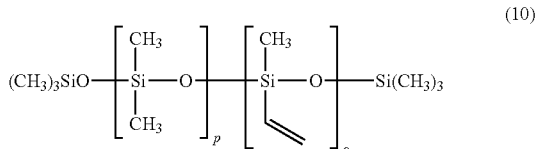
(10)

in which o varies from 0 to 50 and p varies from 1 to 25, and the dimethylsiloxyl and methylvinylsiloxyl groups are alternately arranged and statistically distributed along the chain, by polysiloxanes of the general formula 9, in which l and m have the above-specified meaning; the dimethylsiloxyl and methylhydrosiloxyl groups are alternately arranged and statistically distributed along the chain, in the presence of catalysts of the general formula 1 in which diene and L have the above-specified meaning. The reactions are conducted in a neutral gas atmosphere at a temperature from the range 60-100° C.

According to the invention, on completion of the reaction of organosilicon compounds synthesis, the product or its solution is removed by decantation and then purified. The catalyst remains in the reactor and can be used in subsequent reactions. The catalyst is suitable for multiple uses, usually for over ten times. In certain reactions, the reaction cycle with the use of the same catalyst can be repeated twenty times after which the decrease in the efficiency of the catalyst is small. The invention permits syntheses of new immobilised rhodium complexes containing diene ligands in the coordination sphere of rhodium. The complexes ensure high catalytic activity. According to the invention, the rhodium complexes can be used as catalysts of the reaction of hydrosilylation of the C=C bond. The use of siloxide rhodium catalysts immobilised on the silica surface permits a combination of the benefits of heterogeneous and homogeneous catalysis. At high yield and high selectivity of the catalytic reactions it is possible to use the same portion of the catalysts many times and easily remove the product from the post-reaction mixture. The use of heterogenized rhodium catalysts in the processes specified in the description of the invention permits a multiple repetition of the reaction without the need of supplementing the catalyst amount with high yield. The isolation of the product from the catalyst is easy and effective, and the catalyst after separation from the product e.g. by decantation, does not lose its activity and can be used in subsequent reactions, thus reducing the cost of the reaction.

The invention is illustrated with the examples:
The structure of the new heterogenized siloxyl complexes has been analysed by solid state NMR methods (MAS-NMR) and the content of rhodium has been established by the inductively coupled plasma—optical emission spectroscopy (ICP-OES).

EXAMPLE 1

Portions of 1.2 g of di-μ-trimethylsiloxybis{(1,5-cyclooctadiene)rhodium(I)} and 6 g of Aerosil 200 silica dried at 350° C. were placed in a glass double-neck and round-bottom flask of 50 mL in capacity, equipped with a magnetic stirrer, in a neutral gas atmosphere. After addition of 20 mL of pentane the contents were stirred at room temperature for 24 hours. The solution from above the precipitate was decanted and the precipitate was three times washed with pentane and dried under reduced pressure. The catalyst obtained was (≡SiO)(≡SiOX)Rh(cod)] (Aerosil 200) containing rhodium in the amount of $2.167 \times 10^{-4}$ mol Rh/g.

$^{13}C$ MAS-NMR (ppm)=75. 19 (=CH—, cod); 31.02 ($CH_2$, cod)

$^{29}Si$ MAS-NMR (ppm)=99.68 ($Q^2$), 106.88 ($Q^3$), 110.38 ($Q^4$)

EXAMPLE 2

Portions of 1.2 g of di-μ-trimethylsiloxybis{(1,5-cyclooctadiene)rhodium(I)} and 6 g of Aerosil 200 silica dried at 350° C. were placed in a glass double-neck and round-bottom flask of 50 mL in capacity, equipped with a magnetic stirrer, in a neutral gas atmosphere. After addition of 20 mL of benzene, the contents were stirred at room temperature for 24 hours. Then, benzene was evaporated under reduced pressure and 20 mL of pentane was added. The solution from above the precipitate was decanted and the precipitate was three times washed with pentane and dried under reduced pressure. The catalyst obtained was [(≡SiO)(≡SiOX)Rh(cod)] (Aerosil 200) containing rhodium in the amount of $4.104\times10^{-4}$ mol Rh/g.

$^{13}$C MAS-NMR (ppm)=75. 19 (=CH—, cod); 31.02 (CH$_2$, cod)

$^{29}$Si MAS-NMR (ppm)=99.68 (Q$^2$), 106.88 (Q$^3$), 110.38 (Q$^4$)

EXAMPLE 3

Portions of 1.3 g of di-μ-trimethylsiloxybis{(1,5-cyclooctadiene)rhodium(I)} and 2 g of SBA-15 silica dried at 350° C. were placed in a glass double-neck and round-bottom flask of 50 mL in capacity, equipped with a magnetic stirrer, in a neutral gas atmosphere. After addition of 20 mL of pentane the contents were stirred at room temperature for 24 hours. The solution from above the precipitate was decanted and the precipitate was three times washed with pentane and dried under reduced pressure. The catalyst obtained was [(≡SiO)(≡SiOX)Rh(cod)](SBA-15) containing rhodium in the amount $8.127\times10^{-4}$ mol Rh/g.

$^{13}$C MAS-NMR (ppm)=85.24, 75. 19(=CH—, cod); 29.28 (CH$_2$, cod)

$^{29}$Si MAS-NMR (ppm)=101.02 (Q$^2$), 105.73 (Q$^3$), 108.87 (Q$^4$)

EXAMPLE 4

Portions of 1.33 g of di-μ-trimethylsiloxybis{(tetrafluorobenzobarrelene)rhodium(I)} and 5 g of Aerosil 200 silica dried at 350° C. were placed in a glass double-neck and round-bottom flask of 50 mL in capacity, equipped with a magnetic stirrer, in a neutral gas atmosphere. After addition of 20 mL of pentane the contents were stirred at room temperature for 24 hours. The solution from above the precipitate was decanted and the precipitate was three times washed with pentane and dried under reduced pressure. The catalyst obtained was [(≡SiO)(≡SiOX)Rh(tfb)](Aerosil 200) containing rhodium in the amount $2.32\times10^{-4}$ mol Rh/g $^{13}$C MAS-NMR (ppm)=138.18, 125.50 (=CH—, tfb); 47.84, 39.47 (CH, tfb)

$^{29}$Si MAS-NMR (ppm)=99.74 (Q$^2$), 106.78 (Q$^3$), 110.31 (Q$^4$).

EXAMPLE 5

Portions of 1.2 g of di-μ-trimethylsiloxybis{(norbornadiene)rhodium(I)} and 6.5 g of Aerosil 200 silica dried at 350° C. were placed in a glass double-neck and round-bottom flask of 50 mL in capacity, equipped with a magnetic stirrer, in a neutral gas atmosphere. After addition of 20 mL of benzene, the contents were stirred at room temperature for 24 hours. Then, benzene was evaporated under reduced pressure and 20 mL of pentane was added. The solution from above the precipitate was decanted and the precipitate was three times washed with pentane and dried under reduced pressure. The catalyst obtained was (≡SiO)(≡SiOX)Rh(nbd)](Aerosil 200) containing rhodium in the amount of $5\times10^{-4}$ mol Rh/g.

$^{13}$C MAS-NMR (ppm)=60.57 (=CH—, nbd); 46.54 (—CH$_2$—, nbd)

$^{29}$Si MAS-NMR (ppm)=99.77 (Q$^2$), 106.68 (Q$^3$), 110.33 (Q$^4$)

EXAMPLE 6

Portions of 1.9 g of (1,5-cyclooctadiene)(tricyclohexylphosphine)(trimethylosiloxy) rhodium(l) and 5 g of Aerosil 200 silica dried at 350° C. were placed in a glass double-neck and round-bottom flask of 50 mL in capacity, equipped with a magnetic stirrer, in a neutral gas atmosphere. After addition of 20 mL of pentane the contents were stirred at room temperature for 24 hours. The solution from above the precipitate was decanted and the precipitate was three times washed with pentane and dried under reduced pressure. The catalyst obtained was [(≡SiO)Rh(cod)(PCy$_3$)] (Aerosil 200) containing rhodium in the amount $1.24\times10^{-4}$ mol Rh/g $^{13}$C MAS-NMR (ppm)=26.63 (—CH$_2$—, —Cy)

$^{29}$Si MAS-NMR (ppm)=103.79 (Q$^3$), 108.12 (Q$^4$)

$^{31}$P MAS-NMR (ppm)=23.42

EXAMPLE 7

Portions of 1.33 g of (1,5-cyclooctadiene)(tri-izo-propylphosphine)(trimethylosiloxy) rhodium(I) and 2.5 g of Aerosil 200 silica dried at 350° C. were placed in a glass double-neck and round-bottom flask of 50 mL in capacity, equipped with a magnetic stirrer, in a neutral gas atmosphere. After addition of 20 mL of benzene, the contents were stirred at room temperature for 24 hours. Then, benzene was evaporated under reduced pressure and 20 mL of pentane was added. The solution from above the precipitate was decanted and the precipitate was three times washed with pentane and dried under reduced pressure. The catalyst obtained was [(≡SiO)Rh(cod)(P$'$Pr$_3$)](Aerosil 200) containing rhodium in the amount of $3.2\times10^{-4}$ mol Rh/g.

$^{13}$C MAS-NMR (ppm)=77.34 (=CH—, cod); 40.35 (—CH$_2$—, cod); 20.2 (—CH—CH$_3$)

$^{29}$Si MAS-NMR (ppm)=98.76 (Q$^2$), 103.59 (Q$^3$), 107.98 (Q$^4$)

$^{31}$P MAS-NMR (ppm)=35.72

EXAMPLE 8

Portions of 1.33 g of (1,5-cyclooctadiene)(triphenylphosphine)(trimethylosiloxy) rhodium(I) and 3.6 g of Aerosil 200 silica dried at 350° C. were placed in a glass double-neck and round-bottom flask of 50 mL in capacity, equipped with a magnetic stirrer, in a neutral gas atmosphere. After addition of 20 mL of benzene, the contents were stirred at room temperature for 24 hours. Then, benzene was evaporated under reduced pressure and 20 mL of pentane was added. The solution from above the precipitate was decanted and the precipitate was three times washed with pentane and dried under reduced pressure. The catalyst obtained was [(≡SiO)Rh(cod)(PPh$_3$)](Aerosil 200) containing rhodium in the amount of $2.7\times10^{-4}$ mol Rh/g.

EXAMPLE 9

In a reactor equipped with a reflux and a stirrer, in argon atmosphere, a portion of 0.01 g of [(≡SiO)(≡SiOX)Rh(cod)](Aerosil 200), synthesized as in example 1, was placed, to which 11.1 mL of heptamethyltrisiloxane and 5.8 mL of 1-heptene were subsequently added. The reaction mixture was heated for 1 hour at 100° C. The catalysts were removed from the raw product by decantation and then the product was distilled. The compound obtained was 3-heptylheptamethyltrisiloxane in the yield of 97%.

After decantation of the raw product a new portion of substrates was added and reaction was recurred in the same conditions. The recurrent reaction process was repeated periodically. After 10 times of repetition product was obtained in the yield of 95%, and after 20 times in yield of 50%.

EXAMPLE 10-29

Date for examples 10-29, leaded in the same conditions as in example 9, were shown in table 1:

TABLE 1

| Example | Temp [° C.] | Substrate I Name | Amount [ml] | Substrate II Name | Amount [ml] |
|---|---|---|---|---|---|
| 10 | 100 | poli(methylhydro)siloxane | 8.9 | 1-heptene | 5.8 |
| 11 | 100 | heptamethyltrisiloxane | 11.1 | 1-hexadecene | 12.7 |
| 12 | 100 | poli(methylhydro)siloxane | 8.9 | 1-hexadecene | 12.7 |
| 13 | 100 | heptamethyltrisiloxane | 11.1 | methylbis(trimethylsiloxy)vinylsilane | 12.2 |
| 14 | 20 | triethoxysilane | 8 | allil glicidyl ether | 7.7 |
| 15 | 100 | triethoxysilane | 8 | allil glicidyl ether | 7.7 |
| 16 | 25 | triethoxysilane | 7.7 | allil phenyl ether | 8.5 |
| 17 | 100 | triethoxysilane | 26 | allil phenyl ether | 19.2 |
| 18 | 100 | triethoxysilane | 21.1 | allil butyl ether | 14.3 |
| 19 | 100 | heptamethyltrisiloxane | 11.6 | allil glicidyl ether | 7.7 |
| 20 | 100 | poli(methylhydro)siloxane | 16 | allil glicidyl ether | 13 |
| 21 | 100 | heptamethyltrisiloxane | 20 | allil phenyl ether | 16 |
| 22 | 60 | poli(methylhydro)siloxane | 25 | allil phenyl ether | 23.6 |
| 23 | 100 | heptamethyltrisiloxane | 16.6 | allil butyl ether | 13 |
| 24 | 100 | poli(methylhydro)siloxane | 32 | allil butyl ether | 32 |
| 25 | 100 | heptamethyltrisiloxane | 23 | allilbenzene | 12.5 |
| 26 | 100 | poli(methylhydro)siloxane | 17 | allilbenzene | 12.5 |
| 27 | 100 | heptamethyltrisiloxane | 6.5 | 4-allil-1,2-dimethoxybenzene | 4.5 |
| 28 | 100 | poli(methylhydro)siloxane | 32 | 4-allil-1,2-dimethoxybenzene | 28 |

| Example | Product | Yield [%] after number of subsequent reactions | | |
|---|---|---|---|---|
| | | 1 | 10 | 20 |
| 10 | poli{(heptylmehtyl)(dimethyl)siloxane} | 99 | 99 | |
| 11 | 3-hexadecylheptamethyltrisiloxane | 98 | 95 | |
| 12 | poli{(hexadecylmethyl)(dimethyl) siloxane} | 99 | 99 | |
| 13 | 1,2-bis(heptamethyltrisiloxy)ethane | 88 | 86 | 85 |
| 14 | 3-glicidoxypropyltriethoxysilane | 96 | | |
| 15 | 3-glicidoxypropyltriethoxysilane | 92 | 90* | |
| 16 | 3-phenyloxypropyltriethoxysilane | 84 | | |
| 17 | 3-phenyloxypropyltriethoxysilane | 92 | 90* | |
| 18 | 3-butyloxypropyltriethoxysilane | 90 | 85** | |
| 19 | (3-glicidoxypropyl)methylbis(trimethylsiloxy)silane | 92 | 89* | |
| 20 | poli[((3-glicidoxypropyl) methyl)(dimethyl)siloxane] | 99 | 55 | |
| 21 | (3-phenyloxypropyl)methylbis(trimethylsiloxy)silane | 99 | 87 | |
| 22 | (3-phenyloxypropyl)methylbis(trimethylsiloxy)silane | 99 | 99 | |
| 23 | (3-butyloksypropylo)metylobis(trimetylosiloksy)silane | 96 | 96** | |
| 24 | poli[((3-butyloxypropyl)methyl)(dimethyl)siloxane] | 99 | 99** | |
| 25 | (3-phenylpropyl)methylbis(trimethylsiloxy)silane | 90 | | |
| 26 | poli[(3-phenylpropylmethyl)(dimethyl)siloxane] | 99 | | |
| 27 | (3-(3,4-dimethoxyphenyl)propyl)methylbis(trimethylsiloxy)silane | 90 | 60 | |
| 28 | poli{((3-(3,4-dimethoxyphenyl)propyl)methyl)(dimethyl)siloxane} | 99 | 75 | |

*after 6 times of repetition
**after 3 times of repetition

TABLE 2

| Example | Temp [° C.] | Substrate I Name | Amount [ml] | Substrate II Name | Amount [ml] | Product | Yield [%] after number of subsequent reactions | |
|---|---|---|---|---|---|---|---|---|
| | | | | | | | 1 | 10 |
| 30 | 100 | heptamethyltrisiloxane | 21.7 | 1-hexadecene | 23.3 | 3-hexadecylheptamethyltrisiloxane | 99 | 85 |
| 31 | 100 | heptamethyltrisiloxane | 21.7 | methylbis(trimethylsiloxy)vinylsilane | 24.2 | 1,2-bis(heptamethyltrisiloxy)ethane | 90 | 56 |
| 32 | 20 | triethoxysilane | 30 | allil glicidyl ether | 28 | 3-glicidoxypropyltriethoxysilane | 94 | |
| 33 | 100 | triethoxysilane | 30 | allil glicidyl ether | 28 | 3-glicidoxypropyltriethoxysilane | 94 | 94* |

*after 6 times of repetition

TABLE 3

| | | Substrate I | | Substrate II | | | Yield [%] after number of subsequent reactions | |
|---|---|---|---|---|---|---|---|---|
| Example | Temp [° C.] | Name | Amount [ml] | Name | Amount [ml] | Product | 1 | 10 |
| 35 | 100 | heptamethyltrisiloxane | 6.7 | methylbis(trimethyl-siloxy)vinylsilane | 7.4 | 1,2-bis(heptamethyltrisiloxy)ethane | 90 | 89 |
| 36 | 60 | triethoxysilane | 26 | allil glicidyl ether | 18 | 3-glicidoxypropyltriethoxysilane | 95 | |
| 37 | 60 | triethoxysilane | 7.5 | allil phenyl ether | 6 | 3-phenyloxypropyltriethoxysilane | 95 | |
| 38 | 60 | triethoxysilane | 3 | allil butyl ether | 3.5 | 3-butyloxypropyltriethoxysilane | 80 | |
| 39 | | poli(methylhydro)siloxane | 7.5 | allil glicidyl ether | 6 | poli[((3-glicidoxypropyl) | 99 | |
| 40 | 100 | poli(methylhydro)siloxane | 6.8 | allil butyl ether | 6.8 | poli[((3-butyloxypropyl)methyl)(dimethyl)siloxane] | 99 | |
| 41 | 100 | poli(methylhydro)siloxane | 10.8 | allilbenzene | 7 | poli[((3-phenylpropyl)methyl)(dimethyl)siloxane] | 95 | |

EXAMPLE 29

As in Example 1, 21.7 mL of heptamethyltrisiloxane were reacted with 11.4 mL of 1-heptene in the presence of [(≡SiO)(≡SiOX)Rh(cod)](SBA-15) synthesized as in example 3 The compound obtained was 3-heptyloheptamethyltrisiloxane in the yield of 99%. The recurrent reaction process was repeated periodically. After 10 times of repetition product was obtained in the yield of 85%, and after 20 times in yield of 47%.

EXAMPLE 30-33

Date for examples 30-33, leaded in the same conditions as in example 29, were shown in table 2.

EXAMPLE 34

As in Example 9, 6.7 mL of heptamethyltrisiloxane were reacted with 3.5 mL of 1-heptene in the presence of [(≡SiO)Rh(cod)(PCy3)](Aerosil 200) synthesized as in example 6. The compound obtained was 3-heptyloheptamethyltrisiloxane in the yield of 98%. The recurrent reaction process was repeated periodically. After 10 times of repetition product was obtained in the yield of 95%.

EXAMPLE 35-41

Date for examples 35-41, leaded in the same conditions as in example 34, were shown in table 3:

EXAMPLE 42

As in Example 9, 6.7 mL of heptamethyltrisiloxane were reacted with 7.4 mL of methylbis(trimethylsiloxy)vinylsilane in the presence of [(≡SiO)(≡SiOX)Rh(tfb)](Aerosil 200) synthesized as in example 4. The compound obtained was 1,2-bis(heptamethyltrisiloxy)ethane in the yield of 89%. The recurrent reaction process was repeated periodically. After 10 times of repetition product was obtained in the yield of 50%.

EXAMPLE 43

As in Example 9, 6.7 mL of heptamethyltrisiloxane were reacted with 7.4 mL of methylbis(trimethylsiloxy)vinylsilane in the presence of [(≡SiO)(≡SiOX)Rh(nbd)](Aerosil 200) synthesized as in example 5. The compound obtained was 1,2-bis(heptamethyltrisiloxy)ethane in the yield of 92%. The recurrent reaction process was repeated periodically. After 10 times of repetition product was obtained in the yield of 88%.

LITERATURE

1. Ward M. D., Harris T. V., Schwartz J., *J. Chem. Soc., Chem. Commun.*, 1980, 357;
2. Dufour P., Houtman C., Santini C. C., Nédez C., Basset J. M., Hsu I., Shore S. G., *J. Am. Chem. Soc.*, 1992, 114, 4248
3. Scott S. L., Dufour P., Santini C. C., Basset J. M., *Inorg. Chem.*, 1996, 35, 869;
4. Scott S. L., Mills A., Chao C., Basset J. M., Millot N., Santini C. C., *Journal of Molecular Catalysis A: Chemistry*, 2003, 204-205, 457
5. Marciniec B. (Ed.) *Comprehensive Handbook on Hydrosilylation*, Pergamon Press, Oxford, 1992
6. B. Marciniec, E. Walczuk, P. Błażejewska-Chadyniak, D. Chadyniak, M. Kujawa-Welten, S. Krompiec *In Organosilicon Chemistry V*, 2003, 415
7. B. Marciniec, P. Błażejewska-Chadyniak, M. Kubicki, *Can. J. Chem.*, 81, 2003, 1292;
8. B. Marciniec, P. Krzyżanowski, E. Walczuk-Guściora, W. Duczmal, *J. Mol. Catal. A: Chem.*, 1999, 144, 263.
9. B. Marciniec, J. Gulinski, *J. Organomet. Chem.*, 1993, 446, 15
10. Leadbeater, N. E., Marco, M. 2002 *Chemical Reviews* 102 (10), 3217-3274;
11. Song, C. E., Lee, S.-G. 2002 *Chemical Reviews* 102 (10), 3495-3524
12. Michalska, Z. M., Rogalski, K., Rózga-Wijas, K., Chojnowski, J., Fortuniak, W., Sciborek, M., *Journal of Molecular Catalysis A.* 208 (2004)187-194
13. B. Marciniec, H. Maciejewski, K. Szubert, *Chemical Monthly* 137, 2006, 605
14. Wyszpolska A., Maciejewski H., Chadyniak D., Pawluć P., Marciniec B., *Pol. J. Chem. Technol.*, 5(4), 14, 2003

The invention claimed is:

1. A heterogenized rhodium complex immobilised on a silica support surface, the rhodium complex being of general formula 1:

[(≡SiO)(L)Rh(diene)]          (1)

where:
   diene is cyclooctadiene, norbornadiene, or tetrafluorobenzobarrelene; and
   L is:
      a subsequent unit ≡SiOX on the silica support surface of general formula 2:
      ≡SiOX          (2)

where X is a hydrogen or silicon atom, or
   a phosphine ligand of general formula 3:
      $PR^1_3$          (3)

in which $R^1$ is an alkyl, cycloalkyl, or phenyl group.

2. A method of obtaining a rhodium complex of general formula 1:

[(≡SiO)(L)Rh(diene)]    (1)

the method comprising:
exchanging, in a coordination sphere of rhodium, siloxyl ligands between:
a1. molecular siloxide binuclear complexes of general formula 4:

[{Rh(μ-OSiR²₃)(diene)}₂]    (4)

or
a2. siloxyl mononuclear complexes of general formula 5:

[Rh(diene)(PR¹₃)(OSiR²₃)]    (5)

and
b. silanol groups on a silica support surface;
wherein:
the exchanging is carried out in a neutral gas atmosphere and in an anhydrous solvent that is deoxidised and non-coordinating with rhodium;
diene is cyclooctadiene, norbornadiene, or tetrafluorobenzobarrelene;
R¹ is an alkyl or phenyl group;
R² is an alkyl or phenyl group; and
L is:
a phosphine ligand of general formula 3:

PR¹₃    (3);

or
a subsequent unit ≡SiOX on the silica support surface of general formula 2:

≡SiOX    (2)

where X is a hydrogen or silicon atom.

3. A method for obtaining organosilicon compounds, comprising:
conducting a hydrosilylation reaction between:
compounds selected from alkenes or functionalised alkenes containing a terminal C═C bond, and
compounds containing a Si═H bond selected from the group consisting of silanes, (poly)siloxanes, and (poly)carbosiloxanes,
in the presence of a catalyst in the form of an immobilised rhodium complex of general formula 1:

[(≡SiO)(L)Rh(diene)]    (1)

where:
diene is cyclooctadiene, norbornadiene, or tetrafluorobenzobarrelene, and
L is:
a subsequent unit ≡SiOX on a silica support surface of general formula 2:

≡SiOX    (2)

where X is a hydrogen or silicon atom, or
a phosphine ligand of general formula 3:

PR¹₃    (3)

in which R¹ is an alkyl, cycloalkyl, or phenyl group;
wherein the reaction is carried out in a neutral gas atmosphere at a temperature of from room temperature to 100° C.

4. The method of claim 3, wherein the reaction is conducted between triethoxysilane and alkyl- or aryl-allyl ethers of general formula 7:

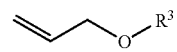    (7)

in which R³ is an alkyl, phenyl, or glycidyl group.

5. The method of claim 3, wherein the reaction is conducted between:
alkenes of general formula 8:

CH₂═CH—(CH₂)ₙ—CH₂R⁴    (8)

in which:
R⁴ is hydrogen when n is from 3 to 13 or R⁴ is an alkoxyl, glicycloxyl, phenoxyl, or phenyl group when n=0, and
poly(methylhydro)siloxanes of general formula 9:

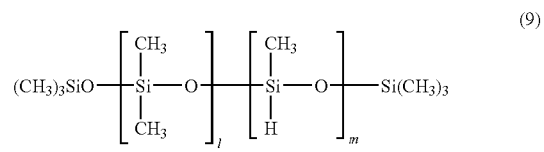    (9)

in which:
l is from 0 to 50;
m is from 1 to 25; and
the dimethylsiloxyl and methylhydrosiloxyl groups are arranged alternately and statistically; and
the reaction is conducted in the neutral gas atmosphere at a temperature of from 60 to 100° C.

6. The method of claim 3, wherein the reaction is conducted between:
vinylsiloxanes of general formula 10:

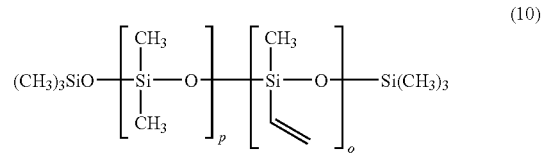    (10)

in which:
o is from 0 to 50;
p is from 1 to 25; and
the dimethylsiloxyl and methylvinylsiloxyl groups are arranged alternately and statistically distributed along the chain; and
poli(methylhydro)siloxane of general formula 9:

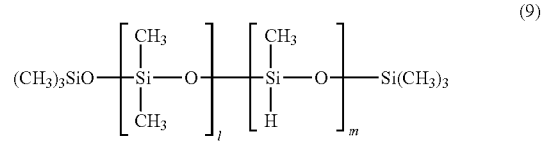    (9)

in which:
l is from 0 to 50;
m is from 1 to 25; and
the dimethylsiloxyl and methylhydrosiloxyl groups are arranged alternately and statistically distributed along the chain; and
the reaction is carried out in the neutral gas atmosphere at a temperature of from 60 to 100° C.

* * * * *